Figure 1:
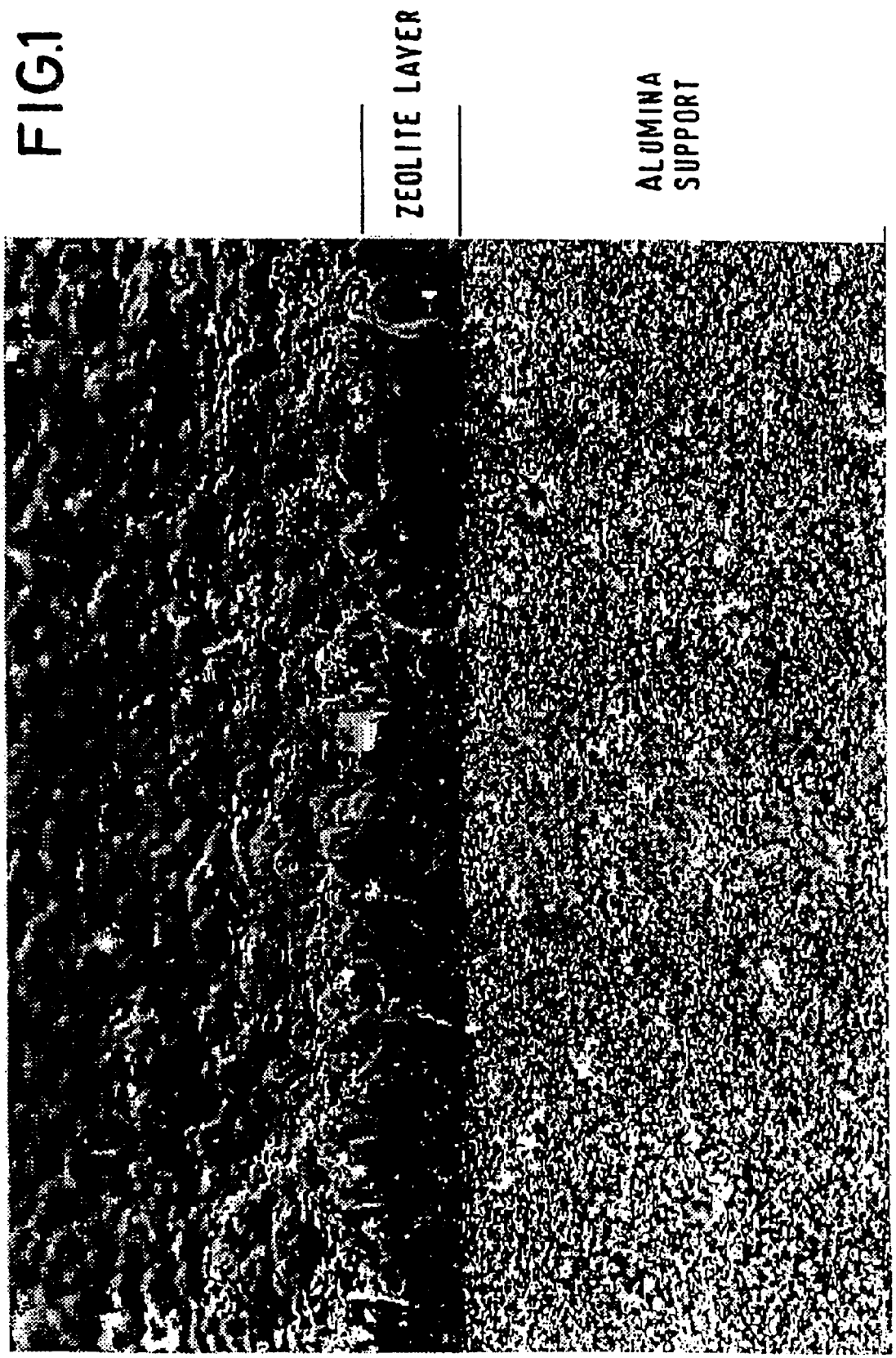

United States Patent [19]

Anthonis et al.

[11] Patent Number: 6,074,457

[45] Date of Patent: Jun. 13, 2000

[54] MOLECULAR SIEVES AND PROCESSES FOR THEIR MANUFACTURE

[75] Inventors: Marc H. Anthonis, Hofstade; Antonie Jan Bons, Kessel-Lo; Lothar Ruediger Czarnetzki, Leuven; Wim Guy Jean-Marie DeGijnst, Nieuwerkerken; Wilfried Jozef Mortier, Kessel-Lo; Cornelius Wilhelmus Maria Van Oorschot, Braschaat, all of Belgium

[73] Assignee: Exxon Chemical Patents Inc., Houston, Tex.

[21] Appl. No.: 09/101,219

[22] PCT Filed: Dec. 2, 1996

[86] PCT No.: PCT/EP96/05579

§ 371 Date: Jan. 13, 1999

§ 102(e) Date: Jan. 13, 1999

[87] PCT Pub. No.: WO97/25129

PCT Pub. Date: Jul. 17, 1997

[30] Foreign Application Priority Data

Jan. 4, 1996 [GB] United Kingdom .................. 9600082

[51] Int. Cl.[7] ............................. B01D 53/22; B01D 71/02
[52] U.S. Cl. ....................................... 95/45; 96/11; 55/524
[58] Field of Search ......................... 55/523, 524; 96/11; 95/45

[56] References Cited

U.S. PATENT DOCUMENTS

| | | | |
|---|---|---|---|
| 4,689,150 | 8/1987 | Abe et al. | 96/11 X |
| 5,019,263 | 5/1991 | Haag et al. | 210/500.25 |
| 5,104,425 | 4/1992 | Rao et al. | 96/11 X |
| 5,120,692 | 6/1992 | Beck | 502/60 |
| 5,415,891 | 5/1995 | Liu et al. | 96/11 X |
| 5,429,743 | 7/1995 | Geus et al. | 96/11 X |
| 5,456,740 | 10/1995 | Snow et al. | 96/11 |
| 5,534,471 | 7/1996 | Carolan et al. | 55/524 X |
| 5,716,527 | 2/1998 | Deckman et al. | 96/11 X |
| 5,723,035 | 3/1998 | Mazanec et al. | 96/11 X |
| 5,753,121 | 5/1998 | Geus et al. | 96/11 X |
| 5,827,569 | 10/1998 | Akiyama et al. | 96/11 X |
| 5,871,650 | 2/1999 | Lai et al. | 96/11 X |

FOREIGN PATENT DOCUMENTS

| | | |
|---|---|---|
| 0485180 | 5/1992 | European Pat. Off. . |
| WO92/13631 | 8/1992 | WIPO . |
| WO96/01682 | 1/1996 | WIPO . |
| WO96/01683 | 1/1996 | WIPO . |
| WO96/01686 | 1/1996 | WIPO . |

*Primary Examiner*—Robert H. Spitzer
*Attorney, Agent, or Firm*—Edward F. Sherer

[57] ABSTRACT

Structures comprising a crystalline molecular sieve layer on a substrate and an additional layer of a refractory material to occlude voids in the molecular sieve layer.

30 Claims, 3 Drawing Sheets

MOLECULAR SIEVES AND PROCESSES FOR THEIR MANUFACTURE

This invention relates to molecular sieves, especially to crystalline molecular sieves, and to layers containing them. More especially, the invention relates to a layer, especially a supported layer, containing a crystalline molecular sieve and a structure comprising such a layer.

Molecular sieves find many uses in physical, physicochemical, and chemical processes, most notably as selective sorbents, effecting separation of components in mixtures, and as catalysts. In these applications, the crystallographically-defined pore structure within the molecular sieve material is normally required to be open, and it is then a prerequisite that any structure-directing agent, or template, that has been employed in the manufacture of the molecular sieve be removed, usually by calcination.

Numerous materials are known to act as molecular sieves, among which zeolites form a well-known class. Examples of zeolites and other materials suitable for use in the present invention will be given below.

In our earlier International Application WO 94/25151, the disclosure of which is incorporated by reference, we have described an inorganic layer comprising optionally contiguous particles of a crystalline molecular sieve, the mean particle size being within the range of from 20 nm to 1 μm on a substrate, which is advantageously porous. When the pores of the substrate are covered to the extent that they are effectively closed, and the substrate is continuous, a molecular sieve membrane results; such membranes have the advantage that they may perform catalysts and separation simultaneously if desired.

In our earlier International Application No. PCT/EP95/02704, the disclosure of which is incorporated herein by reference, we have described such a layer in which the crystals of the sieve extend predominantly in a single direction, especially the direction perpendicular to the plane of the layer, the structure including an additional relatively thin layer between the molecular sieve layer and the substrate. Since the crystals of the layer are ordered, diffusion of materials through the membrane is hampered by grain boundaries to a much reduced extent.

To achieve effective separation of the components of a mixture containing a plurality of molecular species, the structure must be substantially free of voids in the sieve extending through the thickness of the layer that are of sufficient cross-section to allow undiscriminated passage of all species through them. In this specification, the term "void" refers to any break in the continuity of the molecular sieve structure, whether in the form of a crack, an interparticle space, or otherwise, including, for example, a zone of amorphous material which may appear solid but which actually has a molecular structure that allows passage of all species from one surface of the layer to the other.

The presence or absence of such voids may be established by the so-called "dye-permeation test", in which a dyestuff, having a molecular size greater than that of the zeolite pores, but smaller than that of the voids e.g., smaller than about 2 nm, is applied to one face of the structure in a solution in a solvent the molecules of which are small enough to pass through the structure. After being allowed to stand for some seconds, excess dye is washed off with more solvent. The face is then inspected; no coloration indicates absence of voids while their presence is shown by coloration, the depth of color giving a qualitative indication of void concentration. Another test for the insignificance of voids is a pX/mX selectivity, as defined below, of at least 2.0 at a substantially zero pressure differential between opposite faces.

It has been found that while some membrane structures, including those of the International applications mentioned above, pass the test after manufacture, or after calcination to remove any organic template employed in zeolite-forming process, and before use at elevated temperature, re-testing after such use shows that voids have developed. Tests of separation selectivity also indicate a lower than expected separation ability.

Without wishing to be bound by any theory, the applicants believe that the observed deterioration in the soundness of the membrane may be ascribed to physical changes occurring in the support or the zeolite layer (or both) during thermal treatment or separations. These changes may possibly result from mechanical stresses, at least in part caused by the different thermal expansion coefficients of the various parts of the structure. These stresses occur during exposure of the zeolite layer to elevated temperature and pressure in the presence of hydrocarbon molecules. The mechanical stresses may cause deformation and provoke void formation.

To produce an initially void-free membrane it has been proposed to grow the zeolite layer to a great thickness, e.g., about 50 μm, on the basis that no void will extend through the whole thickness of such a layer. A variation on this is to form an additional zeolite layer on to the free face of an existing layer, in the expectation that the locations of voids in the two layers will not coincide. While these treatments may be effective, the additional thickness introduced by either method increases the mass transfer resistance, resulting in low flux through the layer.

The present invention provides, in a first aspect, a structure comprising a substrate, a molecular sieve layer, and a further layer, the further layer being of a refractory material having a melting point of at least 1800° C.

The invention also provides, in this first aspect, a structure in which the further layer is of a refractory material other than silica. Silica is expressly to be avoided because of its water-sensitivity, a serious disadvantage in numerous membrane applications.

Advantageously, the effect of the further layer is to reduce indiscriminate, or non-selective, flux through the structure while having little deleterious effect on the flux of a species capable of passing through the pores of the molecular sieve layer.

Advantageously, the refractory material layer comprises a carbide, especially silicon carbide, or a nitride, especially boron nitride, silicon nitride, or, preferably, titanium nitride. Advantageously, the refractory material is water-insensitive. Other materials may be present in the layer, for example, an oxide may be formed by exposure of the chosen refractory material to the atmosphere; the resulting oxide is preferably also a refractory.

Advantageously, the thickness of the refractory layer is within the range of from 1 nm to 1 μm, more advantageously from 10 to 500 nm, preferably from 20 to 300 nm, and most preferably from 20 to 150 nm.

Surprisingly, the further, refractory, layer appears to occlude any voids present in the molecular sieve layer while not occluding all the pores in the sieve, which are of smaller cross-section than the voids. This is the more surprising in that, in semi-conductor applications, titanium nitride, at least, acts as a diffusion barrier. As a result, undiscriminated passage of molecular species through the molecular sieve layer is reduced, and hence the selectivity of the molecular sieve layer is enhanced. For this reason, the further layer may be regarded as a selectivity enhancing layer, SEL, and this term will be used in certain parts of the following description. It will be appreciated, however, that the layer may have other functions and properties, for example, in the case of layers of material that are hard, the abrasion resistance of the structure is improved. This is of special importance in applications in which the structure is used in association with, for example, catalyst particles which may be packed tightly against a surface.

The refractory material may have another function, especially when it is applied by a method involving elevated temperatures, as is at present preferred. Without wishing to be bound by any theory, it is believed that, at least in the form of a layer, a molecular sieve material may effectively have a negative thermal expansion coefficient. Accordingly, when subjected to elevated temperatures, as occur during, for example, calcination, and certain operation and regeneration procedures, the layer may crack. During application of the refractory layer of the present invention, by a method involving temperatures comparable with such procedures, cracks may appear, but that are filled by the refractory material. On cooling, the molecular sieve material may attempt to expand but cannot do so, because the cracks are filled, and thus the molecular sieve is compressively stressed. On re-heating to operating temperatures, the molecular sieve will not crack again.

Although it is preferred that the SEL be positioned on the free surface of the molecular sieve layer, it will be understood that it may be positioned elsewhere in the structure, and that a plurality of SELs may be included in the structure, of which one is advantageously on a free surface.

Advantageously, the molecular sieve layer is crystalline, and advantageously the crystals are ordered. This may be achieved as described in our above-mentioned Application PCT/EP95/02704. Accordingly, in a second aspect of the invention there is provided a structure comprising a substrate, an intermediate layer, an upper layer, the intermediate layer comprising a crystalline molecular sieve having a crystal size of at most 1 $\mu$m, the upper layer comprising a crystalline molecular sieve of crystals having at least one dimension greater than the dimensions of the crystals of the intermediate layer, and a layer of a refractory material having a melting point of at least 1800° C. or other than silica.

In a third aspect, the present invention provides a structure comprising a substrate, an intermediate layer, an upper layer, the intermediate layer comprising a crystalline molecular sieve having a crystal size of at most 1 $\mu$m, the upper layer comprising a crystalline molecular sieve in which at least 75%, and advantageously at least 85%, of the crystallites at the uppermost face extend to the interface between the upper and intermediate layers, and a layer of a refractory material having a melting point of at least 1800° C. or other than silica.

In a fourth aspect, the present invention provides a structure comprising a substrate, an intermediate layer, an upper layer, the intermediate layer comprising a crystalline molecular sieve having a crystal size of at most 1 $\mu$m, the upper layer comprising a crystalline molecular sieve the crystals of which have a crystallographically preferred orientation (CPO), and a layer of a refractory material having a melting point of at least 1800° C. or other than silica. CPO and a method by which it may be measured are discussed in more detail below.

Advantageously, in each of the second to fourth aspects, the refractory material layer is on the face of the upper layer further from the substrate.

Advantageously, in each of the second to fourth aspects, the intermediate layer is substantially free of voids greater than 4 nm in cross-section extending through the thickness of the layer, i.e., affording a passageway between the substrate and the upper layer.

Advantageously, the crystal size of the molecular sieve in the intermediate layer is at most 300 nm, and preferably from 20 to 120 nm.

Advantageously, the structures of each of the second to fourth aspects have an upper layer having the properties of one of or both the other two of the second to fourth aspects.

The crystals of the upper layer may be columnar.

It will be appreciated that the structure may be of any shape, and may be, for example, planar, cylindrical, especially cylindrical with a circular cross-section, or may be a honeycomb structure. For clarity, however, the following description will refer to the structure as if it were planar, and references will be made to the plane of a layer.

In certain embodiments, at least 75%, as viewed by scanning electron microscopy (SEM), of the grain boundaries in the upper layer are, at least in the region of the uppermost face, within 30° of the perpendicular to the layer plane, more advantageously at least 90% being within that angle, and preferably at least 90% are within 25° and most preferably within 15° of perpendicular. The directions of grain boundaries of the crystals in the upper layer indicate the extent to which the crystals have a shape preferred orientation (SPO).

Materials comprising non-spherical grains may exhibit a dimensional preferred orientation or shape preferred orientation. An SPO may be defined, for example, as a non-random orientation distribution of the longest dimensions of the grains or crystals. Such an SPO may be detected, for instance, on cross-sectional electron micrographs; only the outline of the grains or crystals is considered, the orientation of the longest dimension of each being established and used to determine the orientation distribution.

Because the shape of a grain or crystal is not necessarily related to its crystallographic orientation, SPO is in principle independent from CPO, although in many cases SPO and CPO are related.

The products of the invention may be characterized by x-ray diffraction (XRD), among other techniques. For this purpose a conventional powder diffraction technique may be used, where the supported layered structure in the shape of a disk is mounted in a modified powder sample holder and a conventional 0/2θ scan is performed. The intensities of the zeolite reflexions thus measured are compared to the intensities of the reflexions of a randomly oriented powder of a zeolite of the same structure and composition. If one or more sets of reflexions, related to one or more specific orientations of the crystal, is or are significantly stronger than the remaining reflexions, compared with the diffractogram of a randomly oriented powder, this indicates that the orientation distribution in the sample deviates from random. This is referred to as a crystallographic preferred orientation or CPO. A simple example of a CPO is the case where the 001 reflexions (e.g., 002, 004, 006, etc. for MFI) are strong while all other reflexions are weak or absent. In this case the majority of the crystals has the crystallographic c-axis close to the normal to the plane of the layer; this case is often referred to as a c-axis CPO. Another example is a diffractogram where the h00 reflexions (200, 400, 600, 800 etc. for MFI) are dominant; this is referred to as an a-axis CPO. More complex situations may also occur, for example a diffractogram where both the 0k0 and 001 reflexions dominate, which is referred to as a mixed b- and c-axis CPO.

In the case of a CPO, a unique identification of the crystal structure type based on the XRD diffractrogram of the layer alone may not be possible, because only a limited number of reflexions may be detected. Strictly, the material of the layer should be separated from the substrate, ground to a powder and a randomly oriented powder diffractogram obtained to verify the structure type. In practice this is often difficult. Therefore, if synthesis has yielded any powder product or deposits on the walls or bottom of a reaction vessel, that material is used for the identification of the structure type. If all the reflexions in the diffractogram of the layer are attributable to specific sets of reflexions in the indexed powder diffractogram (e.g., the 001 reflexions), it is a good indication that the layer has the same structure type as the powder.

Quantification of the degree of CPO may be based on a comparison between the observed XRD diffractogram with that of a randomly oriented powder. For each type of crystal structure and CPO a specific set of reflexions may be selected to define a number that may be used as a parameter to describe the degree of CPO. For example, in the case of a structure in which the uppermost layer has the MFI zeolite structure type, and the crystals have a c-axis CPO, a CPO parameter $C_{001}$ may be defined using the intensities, I, of the 002-reflexion and the combined 200 and 020 reflexions, as follows:

$$CPO\ parameter = \frac{(I_{002}/I_{200,020})_S - (I_{002}/I_{200,020})_R}{(I_{002}/I_{200,020})_S} \cdot 100$$

where $I_{200,020}$ and $I_{002}$ are the background-corrected heights of the combined MFI-200,020 reflexions and of the MFI-002 reflexion, respectively, for a randomly oriented powder R and for the sample S under investigation, before calcination. A zero value for the parameter represents random orientation, while a value of 100 represents the absence of (100 ) and (010) planes parallel to the layer plane. The absence of all MFI reflexions except the (001) reflexions indicates a perfect alignment of (001) planes parallel to the layer. It will be understood that for other CPO's or other zeolite types, other reflexions are chosen.

For example, in the case of an a-axis CPO, a parameter $C_{h00}$ may be defined using the intensity of the 10 0 0 reflexion relative to the intensity of, for instance, the sum of the 002 and 0 10 0 reflexions, or the 133 reflexion (before calcination) as in the following definition:

$$c_{h00} = \frac{(I_{10\ 0\ 0}/I_{133})_S - (I_{10\ 0\ 0}/I_{133})_R}{(I_{10\ 0\ 0}/I_{133})_S} \cdot 100$$

For other types of CPO other parameters may be defined. Other ways to measure CPO may also be used, for example, texture goniometry.

It will be understood that in principle SPO and CPO are independent. For example, while substantially all the crystals may exhibit grain boundaries extending perpendicular to the layer plane, the orientation of the crystallographic planes of the crystals may differ. Usually, however, the upper layer will either exhibit strong CPO and SPO or weak CPO & SPO.

Advantageously, in the upper layer, the crystals are contiguous, i.e., substantially every crystal is in contact with its neighbours, although not necessarily in contact with its neighbours throughout its length. (A crystal is in contact with its neighbour if the space between them is less than 2 nm wide.) Preferably, the upper layer is substantially free from defects greater than 4 nm in cross-section, extending through its thickness. Advantageously, the number of such defects, which may be detected by permeation of dye through the layer, does not exceed 2, and preferably does not exceed 0.05, per sq. cm. The contact between crystals may be such that neighbouring crystals are intergrown.

As molecular sieves, there may be mentioned a silicate, an aluminosilicate, an aluminophosphate, a silicoaluminophosphate, a metalloaluminophosphate, or a metalloaluminophosphosilicate.

The preferred molecular sieve will depend on the chosen application, for example, separation, catalytic applications, and combined reaction and separation, and on the size of the molecules being treated. There are many known ways to tailor the properties of the molecular sieves, for example, structure type, chemical composition, ion-exchange, and activation procedures.

Representative examples are molecular sieves/zeolites of the structure types AFI, AEL, BEA, CHA, EUO, FAU, FER, KFI, LTA, LTL, MAZ, MOR, MEL, MTW, OFF, TON and, especially, MFI.

The structure types of the intermediate, if present, and upper layers may be the same or different. Further, if the structure types are the same, the compositions may be the same or different.

Some of the above materials while not being true zeolites are frequently referred to in the literature as such, and this term will be used broadly in the specification below.

The thickness of the upper layer is advantageously within the range of 0.1 to 150 µm, more advantageously from 0.5 to 40 µm, preferably from 0.5 to 20 µm, and most preferably from 1 to 20 µm. Advantageously, the thickness of the layer and the crystallite size of the molecular sieve are such that the layer thickness is approximately the size of the longest edges of the crystals, giving essentially a monolayer.

The thickness of the intermediate layer, if present, is advantageously at most about 1 µm; advantageously, also, however, it is of sufficient thickness to cover irregularities of comparable scale in the surface of the substrate. Advantageously, the intermediate layer is at most the thickness of the upper layer.

The substrate may be either non-porous or, preferably, porous. As examples of non-porous substrate there may be mentioned glass, fused quartz, and silica, silicon, dense ceramic, for example, fired clay, and metals. As examples of porous substrates, there may be mentioned porous glass, sintered porous metals, e.g., steel or nickel, and, especially, an inorganic oxide, e.g., alpha-alumina, titania, an alumina/zirconia mixture, a zeolite or Cordierite.

At the surface in contact with the intermediate layer, if present, the substrate may have pores of dimensions up to 50 times the layer thickness, but preferably the pore dimensions are comparable to the layer thickness. The pore size should, in any event, be compatible with the process employed for making the intermediate layer.

The substrate may be any material compatible with the coating and synthesis techniques, as described, for example below, e.g., porous alpha-alumina with a surface pore size within the range of from 0.004 to 100 µm, more advantageously 0.05 to 10 µm, preferably from 0.08 to 1 µm, most preferably from 0.08 to 0.16 µm, and advantageously with a narrow pore size distribution. The substrate may be multi-layered; for example, to improve the mass transfer characteristics of the substrate, only the surface region of the substrate in contact with the intermediate layer may have small diameter pores, while the bulk of the substrate, toward the surface remote from the layer, may have large diameter pores. An example of such a multilayer substrate is an alpha-alumina disk having pores of about 1 μm diameter coated with a layer of alpha-alumina with pore size about 0.08 μm.

The invention also provides a structure in which the substrate, especially a porous substrate, has molecular sieve layers on each side, the layers on the two sides being the same or different; it is also within the scope of the invention to provide different types of molecular sieve layer on opposite sides of the substrate, or to incorporate other materials in the substrate if it is porous. As indicated above, the further layer may be provided anywhere in the structure.

The intermediate, if present, and upper layers may, and for many uses advantageously do, consist essentially of the molecular sieve material, or may be a composite of the molecular sieve material and intercalating material which may be organic or inorganic. The intercalating material may be the same material as the substrate. The material may be applied simultaneously with or after deposition of the molecular sieve, and may be applied, for example, by a sol-gel process followed by thermal curing. Suitable materials include, for example, inorganic oxides, e.g., silica, alumina, and titania. The intercalating material is advantageously present in sufficiently low a proportion of the total material of the layer that the molecular sieve crystals remain contiguous.

The invention further provides a process for manufacturing a structure.

The present invention provides a process for the manufacture of a structure, which comprises applying to, or forming in or on, a sub-structure a layer of a refractory material having a melting point of at least 1800° C., or one other than silica, the sub-structure comprising a substrate having thereon a molecular sieve layer.

Advantageously, the molecular sieve layer has a free face, and preferably the refractory layer is formed in or on or applied to that free face. Alternatively, if the substrate is porous, the refractory layer may be formed in or on or applied to a free face of the substrate. It will be understood that the refractory layer may be formed within the sub-structure if the substrate or the molecular sieve layer is permeable to the material of the refractory layer or to reactants that will produce the refractory material under the conditions of manufacture.

The sub-structure may be as described above with reference to all aspects of the structure of the invention.

In a preferred process according to the invention, the refractory material is applied or formed by chemical vapour deposition. Though at present less preferred, plasma deposition or sputtering may be employed, as may chemical interfacial reaction. In the last-mentioned process, a reactant is applied at each face, and the refractory material is formed at the interface between the two reactants. Each reactant may be applied by any suitable method including chemical vapour deposition. The refractory material may be applied before or after mounting the sub-structure in a module.

Advantageously, the substructure is one of those mentioned above in connection with the second to fourth aspects of the invention.

Appropriate procedures for forming the substructure are given in detail in our above-mentioned International Application PCT/EP95/02704; advantageously the substructure is calcined before addition of the SEL layer.

Larger substrates, for example, honeycomb reactor sections, may be treated by sealing the substrate in its reactor housing, either before or after applying the intermediate layer, and the synthesis mixture then poured into the housing, or pumped through it, crystallization, washing and calcining taking place with the substrate already in its housing.

A catalytic function may be imparted to the structure of the invention either by bonding of a catalyst to the substrate or the free surface of the SEL layer, or its location within a tube or honeycomb formed of the structure, by its incorporation in the substrate, e.g., by forming the substrate from a mixture of substrate-forming and catalytic site-forming materials or in the intermediate or upper layer itself. If the substrate is porous a catalyst may be incorporated into the pores, the catalyst optionally being a zeolite. For certain applications, it suffices for the structure of the invention to be in close proximity to, or in contact with, a catalyst, e.g. in particulate form on a face of the structure.

Catalytically active sites may be incorporated in the upper layer of the structure, e.g., by selecting as zeolite one with a finite $SiO_2:Al_2O_3$ ratio, preferably lower than 300. Ion-exchange of the zeolite with cations, e.g., $NH_4$ or metal cations or complexes, will result in a layer having Lewis acid sites having catalytic activity. Metal or metal oxide precursors may be included in the synthesis mixture for the intermediate or upper layer, or both, or metal, metal oxides, salts or organic complexes may be incorporated by impregnation of or ion-exchange with the pre-formed upper layer. The structure may also be steamed, or treated in other manners known per se, to adjust properties.

The layers may be configured as a membrane, a term used herein to describe a barrier having separation properties, for separation of fluid (gaseous, liquid, or mixed) mixtures, for example, separation of a feed for a reaction from a feedstock mixture, or in catalytic applications, which may if desired combine catalysed conversion of a reactant or reactants and separation of reaction products.

Separations which may be carried out using a membrane comprising a structure in accordance with the invention include, for example, separation of normal alkanes from co-boiling hydrocarbons, for example, normal alkanes from isoalkanes in $C_4$ to $C_6$ mixtures and $n$-$C_{10}$ to $C_{16}$ alkanes from kerosene; separation of normal alkanes and alkenes from the corresponding branched alkane and alkene isomers; separation of aromatic compounds from one another, especially separation of $C_8$ aromatic isomers from each other, more especially para-xylene from a mixture of xylenes and, optionally, ethylbenzene (e.g. separation of p-xylene from a p-xylene-rich mixture produced in a xylene isomerization process), and separation of aromatics of different carbon numbers, for example, mixtures of benzene, toluene, and mixed $C_8$ aromatics; separation of aromatic compounds from aliphatic compounds, especially aromatic molecules with from 6 to 8 carbon atoms from $C_5$ to $C_{10}$ (naphtha range) aliphatics; separation of aromatic compounds from aliphatic compounds and hydrogen in a reforming reactor; separation of olefinic compounds from saturated compounds, especially light alkenes from alkane/alkene mixtures, more especially ethene from ethane and propene from propane; removing hydrogen from hydrogen-containing streams, especially from light refinery and petrochemical gas streams, more especially from $C_2$ and lighter components; removing hydrogen from the products of refinery and chemical processes such as the dehydrogenation of alkanes to give alkenes, the dehydrocyclization of light alkanes or alkenes to give aromatic compounds and the dehydrogenation of ethylbenzene to give styrene; removing alcohols from aqueous streams; and removing alcohols from hydrocarbons, especially alkanes and alkenes, that may be present in mixtures formed during the manufacture of the alcohols.

Conversions which may be effected include isomerizations, e.g., of alkanes and alkenes, conversion of methanol or naphtha to alkenes, hydrogenation, dehydrogenation. e.g., of alkanes, for example propane to propylene, oxidation, catalytic reforming or cracking and thermal cracking.

Feedstocks derived from hydrocarbons, e.g., in the form of petroleum or natural gas or feedstocks derived from coal, bitumen or kerogen, or from air, the feedstocks containing at least two different molecular species, may be subjected to separation, e.g., by molecular diffusion, by contact with a structure according to the invention, advantageously on configured as a membrane, at least one species of the feedstock being separated from at least one other species.

The following table gives examples of such separations.

| Feedstock | Separated Molecular Species |
| --- | --- |
| Xylenes (ortho, para, meta) and ethylbenzene | Paraxylene |
| Hydrogen, $H_2S$, and ammonia | Hydrogen |
| Normal and isobutanes | Normal butane |
| Normal and isobutenes | Normal butane |
| Kerosene containing $C_9$ to $C_{18}$ normal paraffins | $C_9$ to $C_{18}$ normal paraffins |
| Nitrogen and oxygen | Nitrogen (or oxygen) |
| Hydrogen and methane | Hydrogen |
| Hydrogen, ethane and ethylene | Hydrogen and/or ethylene |
| Coker naphtha containing $C_5$ to $C_{10}$ normal olefins and paraffins | $C_5$ to $C_{10}$ normal olefins and paraffins |
| Methane and ethane mixtures containing argon, helium, neon, or nitrogen | Helium, neon, and/or argon |
| Intermediate reactor catalytic reformer products containing hydrogen and/or light gases | Hydrogen, and/or light gases ($C_1$–$C_7$) |
| Fluid catalytic cracking products containing $H_2$ and/or light gases | Hydrogen, and or light gases |
| Naphtha containing $C_5$ to $C_{10}$ normal paraffins | $C_5$ to $C_{10}$ normal paraffins |
| Light coker gas oil containing $C_9$ to $C_{18}$ normal olefins and paraffins | $C_9$ to $C_{18}$ normal olefins and paraffins |
| Normal and isopentanes | Normal pentane |
| Normal and isopentenes | Normal pentene |
| Ammonia, hydrogen, and nitrogen | Hydrogen and nitrogen e.g. |
| 10-carbon aromatics | Paradiethyl-benzene |
| Mixed butenes | Butene-1 |
| Sulpha and/or nitrogen compounds | $H_2S$ and/or $NH_3$ |
| Toluene/benzene mixtures | Benzene |

Examples of chemical reactions which may be effected by the structure of the invention, advantageously one configured as a membrane, in association with a catalyst, (e.g., the catalyst is in a module with the structure) or treated to impart a catalytic function to the structure, are given in the following table:

| Feedstock/process | Product Yielded |
| --- | --- |
| Mixed xylenes (para, ortho, meta) and ethylbenzene | Paraxylene and/or ethylbenzene |
| Ethane dehydrogenation to ethylene | Hydrogen |
| Ethylbenzene dehydrogenation to styrene | Hydrogen |
| Butanes dehydrogenation to butenes (iso's and normals) | Hydrogen |
| Propane dehydrogenation to propylene | Hydrogen |
| $C_{10}$–$C_{18}$ normal paraffin dehydrogenation to olefins | Hydrogen |
| Hydrogen Sulphide decomposition | Hydrogen |
| Reforming | Hydrogen, light hydrocarbons ($C_1$–$C_7$) |
| Light Petroleum Gas dehydrogenation/aromatization | Hydrogen |
| Mixed Butenes | Butene-1 |

The structure of the invention may be employed as a membrane in such separations and conversions without the problem of being damaged by contact with the materials to be treated. Furthermore, many of these processes are carried out at elevated temperatures, for example, as high as 500° C., and it is an advantage of the structure of the present invention that it may be used at such elevated temperatures.

The present invention accordingly also provides a process for the separation of a fluid mixture which comprises contacting the mixture with one face of a structure according to the invention in the form of a membrane under conditions such that at least one component of the mixture has a different steady state permeability through the structure from that of another component and recovering a component or mixture of components from the other face of the structure.

The invention further provides a process for catalysing a chemical reaction which comprises contacting a feedstock with a structure according to the invention which is in active catalytic form under catalytic conversion conditions and recovering a composition comprising at least one conversion product.

The invention further provides a process for catalysing a chemical reaction which comprises contacting a feedstock with a structure according to the invention, that is in the form of a membrane and in active catalytic form, under catalytic conversion conditions, and recovering from an opposite face of the structure at least one conversion product, advantageously in a concentration differing from its equilibrium concentration in the reaction mixture.

The invention further provides such processes for catalysing a chemical reaction in which the structure is in close proximity to or in contact with a catalyst.

The invention also provides a process for catalysing a chemical reaction which comprises contacting one reactant of a bimolecular reaction with one face of a structure according to the invention, that is in the form of a membrane and in active catalytic form, under catalytic conversion conditions, and controlling the addition of a second reactant by diffusion from the opposite face of the structure in order more precisely to control the reaction conditions. The process may, for example, be used to control ethylene, propylene or hydrogen addition to benzene in the formation of ethylbenzene, cumene or cyclohexane respectively.

The following Examples, in which parts are by weight unless indicated otherwise, illustrate the invention:

Support disks, seed sols and synthesis mixture were prepared as follows:

α-alumina disks with ca. 80-nm pores and ca. 30% porosity, thickness 3 mm, diameter 25 mm, were cleaned by calcining in air for 2 hours at 600° C. followed by ultrasound cleaning in acetone for 5 minutes. The disks were soaked with water overnight in vacuum.

The following seed sols were prepared:

| | |
|---|---|
| Sol 1, ca 50 nm silicalite crystals | 10.64 wt % solids. |
| Sol 2, ca. 120 nm silicalite crystals | 3.7 wt % solids. |
| Sol 3, mixture of 75 wt % Sol 1 and 25 wt % Sol 2. | |

Sol 1 was prepared by dissolving 11.47 g of NaOH (Baker 0402, >98% pure, in 818 g of a 20 wt % aqueous solution of tetrapropylammonium hydroxide (TPAOH-Fluka 88111). Then 176 g of silicic acid hydrate (Baker 0324.5) were added and the mixture boiled for 10 minutes with stirring. After cooling, the water lost by boiling was made up, the mixture was transferred to a polypropylene flask which was placed in an oil bath at 50° C., and maintained at that temperature for 14 days. The resulting slurry was washed until the wash water pH fell below 10.

Sol 2 was prepared by mixing a highly alkaline synthesis mixture with a synthesis mixture of low alkalinity.

The highly alkaline mixture was prepared as described above for Sol 1, using 102.36 g of TPAOH (Fluka 88111), 1.445 g of NaOH (Baker 0402) and 20.95 g silicic acid hydrate (Baker 0324.5), but with boiling for 5 minutes only.

On cooling, the mixture was aged at room temperature for about 7½ months.

The low alkaline mixture was prepared by dissolving 0.599 g of NaOH in 139.46 g deionized water in a glass beaker. 4.69 g of tetrapropylammonium bromide (TPABr) (Fluka 88105) were added and stirred with a magnetic stirrer until completely dissolved. Finally 50.06 g colloidal silica (Ludox AS-40, du Pont) were added, the mixture stirred for 2 minutes, then aged for 19 days at room temperature.

The two aged synthesis mixtures were mixed, using 28.38 g of the low alkaline mixture and 3.17 g of the high alkaline mixture, and crystallized for 18 hours at 175° C. in a 125 ml tube autoclave. The resulting slurry was washed until the wash water pH fell below 10. Electron microscopic inspection of the seeds reveals flat, oval seeds, of dimensions about 120×90 (oval surface)×50 (height) nm, i.e., an aspect ratio of somewhat above 2.

The soaked disks were placed in the specimen chuck of a Convac MTS-4 spinner, and spun at 4000 rpm for 30 seconds to remove excess water. Then the disks were covered with the seed sols as listed in the Table below, and after 10 seconds spun at 4000 rpm for 30 seconds to obtain a thin zeolite nucleation layer.

The coated disks were clamped in a stainless steel holder and placed in a stainless steel autoclave with the seeded side facing downwards and at a distance of 8 mm from the autoclave floor.

To form the synthesis mixture itself, sodium hydroxide was weighed into a polyethylene bottle, water was added and the solution stirred with a magnetic stirrer until the sodium hydroxide was completely dissolved. TPABr was then added and the mixture was stirred until the salt was completely dissolved. Finally, a silica gel (LUDOX HS) was added and the mixture vigorously stirred for two minutes.

The resulting molar composition of the synthesis mixture was:

$$0.22\ Na_2O/10\ SiO_2/283\ H_2O/0.52\ TPABr$$

The synthesis mixture was poured in the autoclave until the liquid surface was just below the upper surface of the disk. The autoclave was closed, placed in an oven and heated to 175° C. for 24 hours.

After cooling down, the autoclave was opened, the disk removed and placed in 200 ml of demineralized water at ca 80° C. After one hour the water was refreshed. This washing step was repeated until the conductivity of the water was >5 μSiemens/cm after being in contact with the disk for at least one hour at 80° C.

Any zeolites formed on the non-seeded face of the disk were removed by mechanical grinding.

The disks were then dried overnight in air in an oven at 105° C.

Subsequently the disks were calcined by heating up at 10° C./hour to 500° C., keeping at 500° C. for 16 hours under an air flow of 0.5 liter/min, and cooling down to room temperature.

After calcination a dye test was performed, by covering the zeolite layer with 5 wt % Rhodamine-B in methanol, letting stand for 10 seconds, and washing off the excess dye with methanol. The permeation of air through the disks was measured at room temperature by applying air at an absolute pressure of 3 bar to the membrane side, the support side being connected to the open air, absolute pressure 1 bar, through a flow meter. The results of the tests are summarized in the Table below.

The disks were then coated with TiN using chemical vapour deposition (CVD). For this purpose, each disk was placed in a brass holder that shielded the back and part of the sides of the disk. Then the disk received a thermal pre-treatment in the CVD-reactor by heating up at 100° C./hour to 700° C., keeping at 700° C. for 2 hours under 200 mTorr nitrogen, and cooling down to room temperature. During this pre-treatment and also during the subsequent coating step, copper was evaporating from the brass holder.

Then the disk was re-introduced in the CVD-reactor at less than 350° C., heated to 700° C. at 100° C./hour, and coated with TiN using $TiCl_4$, $NH_3$ and $H_2$ as reactant gases under conditions that form a layer of thickness ca. 200 nm on a silicon wafer reference material. The reactor was cooled down at 100° C./hour to 450° C., opened to atmosphere, and then left to cool to room temperature.

Each membrane coated with titanium nitride as SEL was subjected to the air permeation test described above, with results as shown in the Table below. Subsequently the membrane was mounted in a holder with connections for feed and sweep gas inlets and permeate and retentate outlets. At a temperature of 250° C., the membrane was fed with a hydrocarbon mixture, typically of about 14.3% ethyl benzene, 21.3% p-xylene (pX), 51.3% m-xylene (mX) and 13.1% o-xylene. The hydrocarbon feed was diluted with hydrogen at a ratio of 1:1. Hydrogen was used as a sweep gas at the permeate side of the zeolite membrane. The membrane was heated further to 360° C. and the permeate and retentate gas mixtures were analysed by an on-line gas-chromatograph. From the GC analysis the flux and the selectivity were calculated at different pressures. The pX/mX selectivity (α) is defined as follows:

$$\alpha = \frac{pX\ \text{conc. (perm.)}}{mX\ \text{conc. (perm.)}} \cdot \frac{mX\ \text{conc. (feed)}}{pX\ \text{conc. (feed)}}$$

The total flux through the membrane is determined by the hydrocarbon feed rate, the concentration of the hydrocarbons in the feed and permeate stream, the ratio of sweep to feed gas flow rate and the membrane area.

TABLE

| Example | Seed Sol | Dye Test | Air Perm. (ml/min) Before TiN | Air Perm. (ml/min) After TiN | Pressure (bar) feed | Pressure (bar) permeate | after TiN Selectivity pX/mX | Total Flux × 10⁴ (mol/m²/s) |
|---|---|---|---|---|---|---|---|---|
| 1 | Sol 1 | light pink | 14 | 4.3 | 1 | 1 | 2.1 | 0.2 |
| 2 | Sol 2 | light pink | 27 | 2.5 | 1 | 1 | 2.3 | 2.7 |
| 3 | Sol 3 | light pink | 25 | 3.2 | 1 | 1 | 8.0 | 0.5 |
| 4 | Sol 3 | light pink | not measured | 1.1 | 1 | 1 | 3.4 | 2.5 |
|   |   |   |   |   | 3 | 3 | 3.0 | 8.5 |
|   |   |   |   |   | 5 | 5 | 3.2 | 10.4 |
|   |   |   |   |   | 7 | 7 | 3.1 | 19.4 |

As shown in the Table above, the selectivity of the membrane of Ex. 4 is independent of the pressure and the flux is proportional to the system pressure.

The examples also show that the SEL-coated membrane is stable at temperatures in excess of 350° C.

Figure 2:
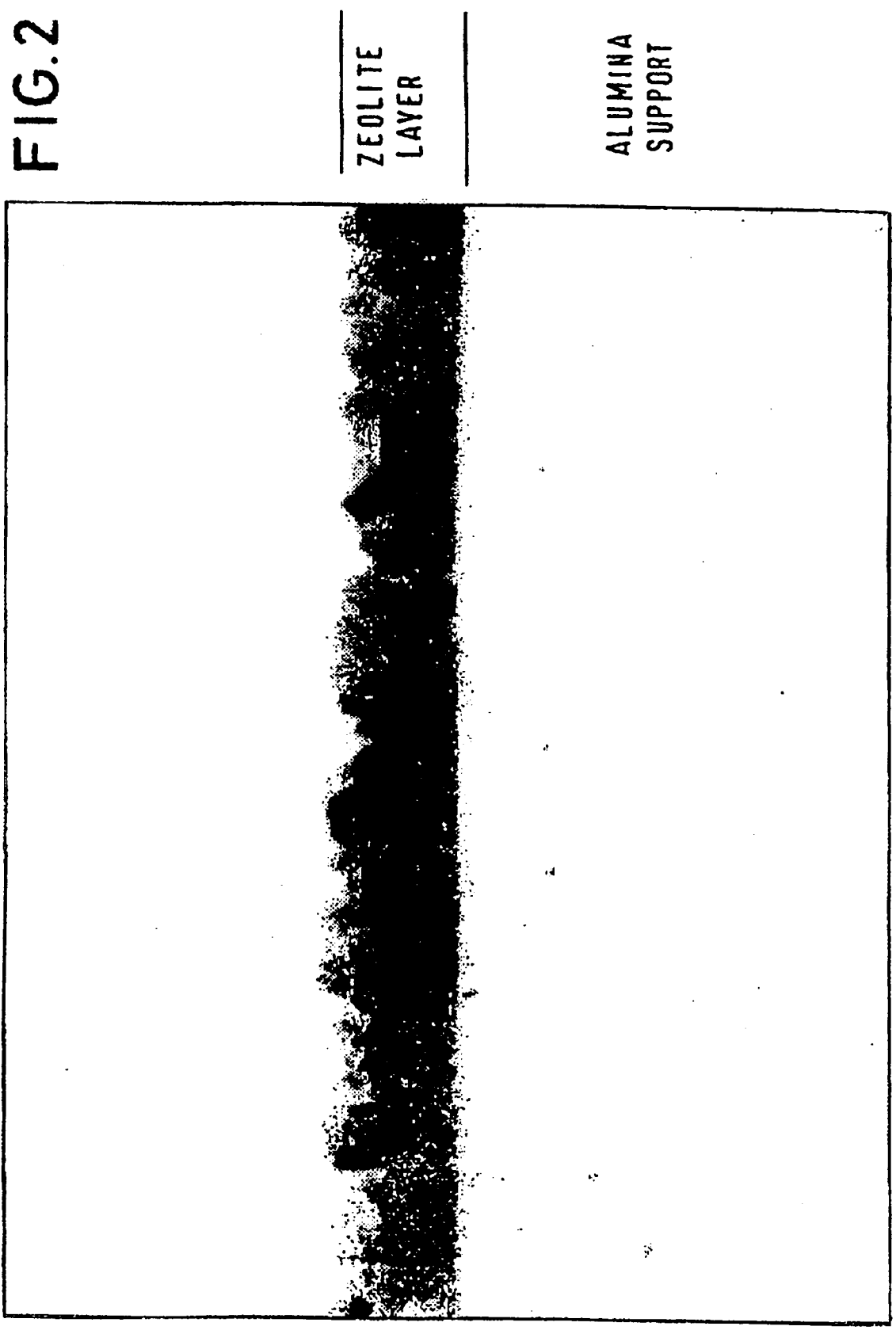
Figure 3:
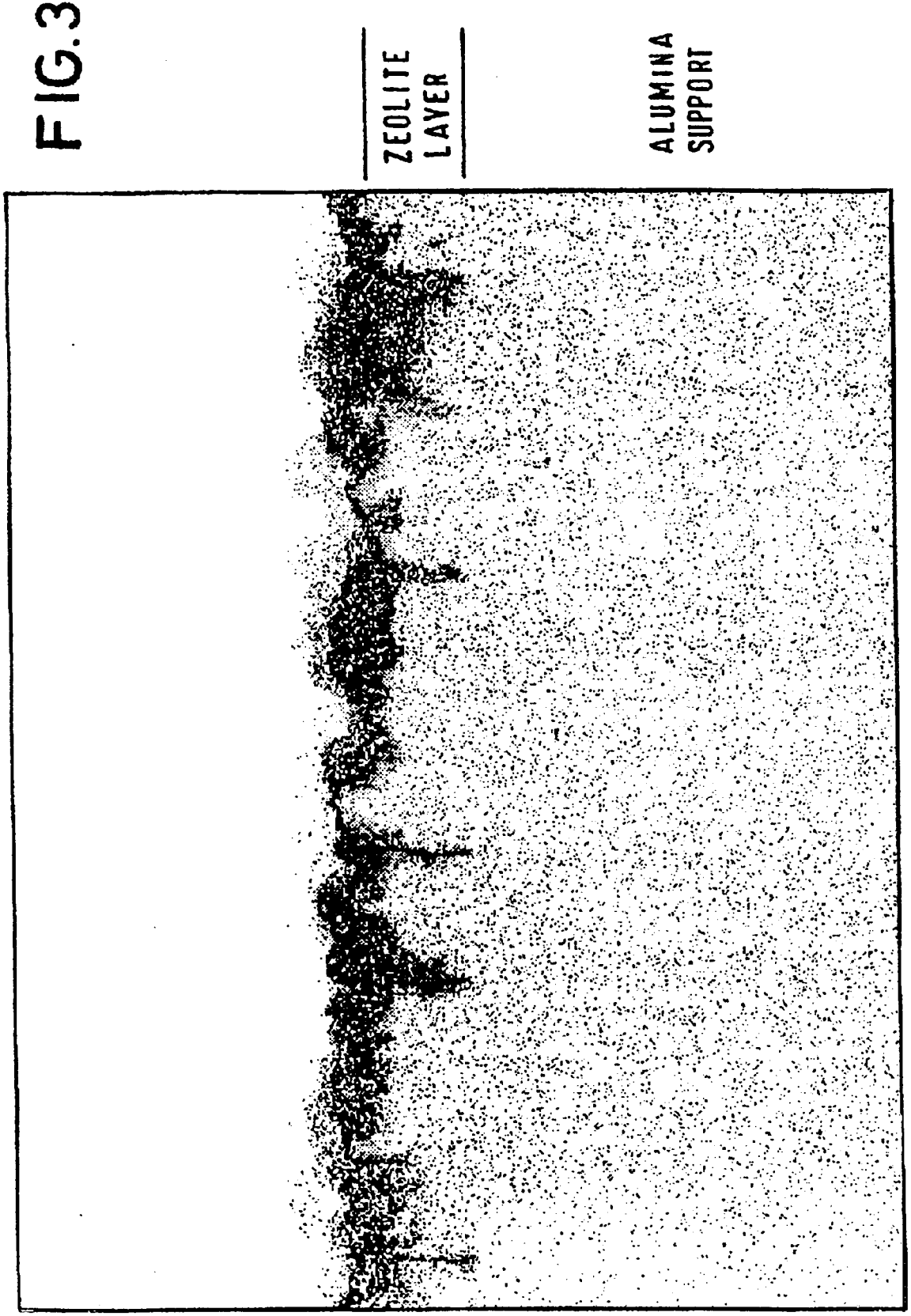

The accompanying drawings show:

in FIG. 1, the secondary electron image of the membrane of Ex. 4, in FIG. 2, the Si element map of the same membrane, and, in FIG. 3, the Ti element map of the same membrane.

In FIG. 1, there are shown in turn, starting from the bottom of the figure, a cross-section of the support disk, a cross-section of the membrane itself, and a perspective view of the TiN-covered membrane surface.

In FIG. 2, the central dark band shows the Si atoms in the cross-section of the membrane.

In FIG. 3, the membrane with its accompanying TiN refractory layer is shown as the central band, with a number of cracks in the membrane filled by the TiN.

What is claimed is:

1. A structure in the form of a membrane comprising a porous substrate, a molecular sieve layer, and a further layer, characterized in that the further layer is of a refractory material having a melting point of at least 1800° C. and a thickness of at least 1 nm.

2. A structure as claimed in claim 1 wherein the further layer is of refractory material other than silica.

3. A structure as claimed in claim 1, wherein the crystals of the molecular sieve layer are contiguous.

4. A structure as claimed in claim 1, wherein the refractory material is a nitride or a carbide.

5. A structure as claimed in claim 4, wherein the refractory material is titanium nitride.

6. A structure as claimed in claim 4, wherein the refractory material is silicon carbide or boron nitride.

7. A structure as claimed in claim 1, wherein the refractory material is water-insensitive.

8. A structure as claimed in claim 1, wherein the thickness of the layer of refractory material is within the range of from 1 nm to 1 μm.

9. A structure as claimed in claim 8 wherein said layer of refractory material has a thickness in the range of from 10 to 500 nm.

10. The structure of claim 9 wherein said layer has a thickness in the range of from 20 to 300 nm.

11. A structure as claimed in claim 1, wherein the substrate is alpha-alumina or a porous metal.

12. A structure as claimed in claim 1 wherein said further layer is positioned on top of said molecular sieve layer.

13. A structure as claimed in claim 12 which further comprises an intermediate layer comprising a crystalline molecular sieve having a crystal size of at most 1 μm, and the molecular sieve layer is an upper layer comprising crystalline molecular sieve of crystals having at least one dimension greater than the dimensions of the crystals of the intermediate layer.

14. A structure as claimed in claim 13, wherein the intermediate layer is substantially free of voids extending through the thickness of the layer.

15. A structure as claimed in claim 13, wherein the intermediate layer and the molecular sieve layer are of MFI zeolite.

16. A structure as claimed in claim 15, wherein the crystals have a crystallographically preferred orientation in which the c-axis extends in the direction of the upper layer thickness.

17. A structure as claimed in claim 15, wherein the crystals have a crystallographically preferred orientation in which an axis other than the c-axis extends in the direction of the upper case thickness.

18. A structure as claimed in claim 12 which further comprises an intermediate layer comprising a crystalline molecular sieve having a crystal size of at most 1 μm, and the molecular sieve layer is an upper layer comprising a crystalline molecular sieve in which at least 75% of the crystallites at the uppermost face extend to the interface between the upper and intermediate layers.

19. A structure as claimed in claim 12 which further comprises an intermediate layer comprising a crystalline molecular sieve having a crystal size of at most 1 μm, and the molecular sieve layer is an upper layer comprising a crystalline molecular sieve the crystals of which have a crystallographically preferred orientation (CPO).

20. A process for the separation of a fluid mixture which comprises contacting the mixture with one face of a structure as claimed in claim 1, under conditions such that at least one component of the mixture has a different steady state permeability through the structure from that of another component and recovering a component or mixture of components from the other face of the structure.

21. A process for catalysing a chemical reaction which comprises contacting a feedstock with a structure as claimed in claim 1, which is in active catalytic form under catalytic conversion conditions and recovering a composition comprising at least one conversion product.

22. A process as claimed in claim 21, wherein the structure is in close proximity to or in contact with a catalyst or a further catalyst.

23. A process for catalysing a chemical reaction which comprises contacting a feedstock with a structure as claimed in claim 1 in the form of a membrane and in active catalytic form, under catalytic conversion conditions, and recovering from an opposite face of the structure at least one conversion product.

24. A process as claimed in claim 23, wherein the conversion product is in a concentration differing from its equilibrium concentration in the reaction mixture.

25. A process for catalysing a chemical reaction which comprises contacting one reactant of a bimolecular reaction with one face of a structure as claimed in claim 1 in the form of a membrane and in active catalytic form, under catalytic conversion conditions, and controlling the addition of a second reactant by diffusion from the opposite face of the structure in order more precisely to control the reaction conditions.

26. A membrane for performing chemical separations or catalytic chemical reactions comprising:
(a) a substrate having two surfaces;
(b) at least one molecular sieve layer applied to one or both surfaces of said substrate; and
(c) a layer of refractory material applied to a surface of said molecular sieve layer, said refractory material selected from the group consisting of nitrides and carbides and having a thickness of at least 1 nm.

27. The membrane of claim 26 wherein said substrate is a porous support.

28. A process for the manufacture of a structure which comprises applying to a substructure a layer of a refractory material other than silica having a melting point of at least 1800° C., the substructure comprising a substrate having thereon a molecular sieve layer, said layer of refractory material having a thickness of at least 1 nm.

29. A process as claimed in claim 28, wherein the refractory material is applied or formed by chemical vapour deposition.

30. A process as claimed in claim 28 wherein said layer of refractory material is positioned on top of said molecular sieve layer.

* * * * *